US006154721A

United States Patent [19]

Sonnic

[11] Patent Number: 6,154,721

[45] Date of Patent: Nov. 28, 2000

[54] METHOD AND DEVICE FOR DETECTING VOICE ACTIVITY

[75] Inventor: Estelle Sonnic, Bagneux, France

[73] Assignee: U.S. Philips Corporation, New York, N.Y.

[21] Appl. No.: 09/044,543

[22] Filed: Mar. 19, 1998

[30] Foreign Application Priority Data

Mar. 25, 1997 [FR] France .................................. 97 03616

[51] Int. Cl.[7] .................................................... G10L 15/20

[52] U.S. Cl. .......................... 704/233; 704/226; 704/213

[58] Field of Search .................................... 704/208, 211, 704/213, 215, 216, 226, 233, 214

[56] References Cited

U.S. PATENT DOCUMENTS

| | | | |
|---|---|---|---|
| 4,052,568 | 10/1977 | Jankowski | 179/15 |
| 4,696,039 | 9/1987 | Doddington | 704/215 |
| 5,307,441 | 4/1994 | Tzeng | 395/2.31 |
| 5,337,251 | 8/1994 | Poster | 704/233 X |
| 5,459,814 | 10/1995 | Gupta et al. | 704/233 |
| 5,533,133 | 7/1996 | Lamkin et al. | 704/226 X |
| 5,596,680 | 1/1997 | Chow et al. | 704/248 |
| 5,675,639 | 10/1997 | Itani | 704/226 X |
| 5,737,695 | 4/1998 | Lagerqvist et al. | 455/79 |
| 5,838,269 | 11/1998 | Xie | 341/139 |
| 5,911,128 | 6/1999 | DeJaco | 704/221 |

FOREIGN PATENT DOCUMENTS

| | | |
|---|---|---|
| 0392412A2 | 10/1990 | European Pat. Off. . |
| 0451796B1 | 10/1991 | European Pat. Off. . |

OTHER PUBLICATIONS

Yohtaro Yatsuzuka, "Highly Sensitive Speech Detector and High–Speed Voiceband Data Discrimiinator in DSI–ADPCM Systems", IEEE Transactions on Communications, vol. COM–30, No. 4, Apr. 1982, pp. 739–750.

*Primary Examiner*—David R. Hudspeth
*Assistant Examiner*—Abul K. Azad
*Attorney, Agent, or Firm*—Dicran Halajian

[57] ABSTRACT

The invention relates to a device intended for detecting in successive frames containing voice signals mixed with noise from various sources the periods of speech and those of only noise. By calculating for each frame its energy and the zero-crossing rate of its centered noise signal and by comparing these magnitudes with adaptive threshold values, the real state of the device is detected, which leads to specific controls adapted for each state.

8 Claims, 5 Drawing Sheets

METHOD AND DEVICE FOR DETECTING VOICE ACTIVITY

FIELD OF THE INVENTION

The present invention relates to a detection method of detecting voice activity in input signals including speech signals, noise signals and periods of silence. The invention likewise relates to a detection device for detecting voice activity for implementing this method.

BACKGROUND OF THE INVENTION

This invention may be utilized in any application where speech signals occur (and not purely audio signals) and where it is desirable to have a discrimination between sound ranges with speech, background noise and periods of silence and audio ranges which contain only noise or periods of silence. The invention may particularly form a useful pre-processing mode in applications for recognizing phrases or isolated words.

SUMMARY OF THE INVENTION

It is a first object of the invention to optimize the passband reserved for speech signals relative to other types of signals, in the case of transmission networks habitually transporting data other than only speech (it must be verified whether speech does not occupy the whole passband, that is to say, that the simultaneous passage of speech and other data is actually possible), or also, for example, to optimize the place occupied in the memory by the messages stored in a digital telephone answering machine.

For this purpose, the invention relates to a method as defined in the opening paragraph of the description and which is furthermore characterized in that a first step of calculating energy and zero-crossing rate of the centered noise signal and a second step of classifying and processing said input signals are applied to these input signals, said classifying and processing step of the input signals as speech or as noise depending on the energy values of said input signals with respect to an adaptive threshold B and on the calculated zero crossing rates.

It is another object of the invention to propose a device for detecting voice activity permitting a simple use of the presented method.

For this purpose, the invention relates to a detection device for detecting voice activity in input signals including speech signals, noise signals and periods of silence, characterized in that said input signals are available in the form of successive digitized frames of predetermined duration and in that said device comprises the serial arrangement of a stage for the initialization of the used variables, a stage for the calculation of the energy of each frame and the zero-crossing rate of the centered noise signal, and a processing and test stage realized in the form of a three-stage automaton, these three stages being:

during the first N-INIT frames, a first state of initialization, provided for the adjustment of said variables and during which any input signal is always considered a speech signal;

a second and a third state during which any input signal is considered a "speech+noise+silence" signal and a "noise+silence" signal respectively, said device always being, after the N-INIT first frames, in either one of said second and third states.

In the proposed embodiment, this classification leads to three possible states called initialization state, state of the presence of speech and state of the presence of noise, respectively.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Before the invention will be described, first several conditions of use of the proposed method will be described in more detail, that is to say, first that the input signals coming from a single input source correspond to voice signals (or speech signals) emitted by human beings and mixed with background noise which may have very different origins (background noise of restaurants, offices, passing vehicles, etc.). Furthermore, these input signals are to be digitized before being processed according to the invention and this processing implies that one may use sufficient ranges (or frames) of these digitized input signals, for example, successive frames of about 5 to 20 ms. Finally, it will be pointed out that the proposed method which is independent of any other later processing applied to the speech signals has been tested here with digital signals sampled at 8 kHz and filtered so as to be situated only in the telephone frequency band (300–3400 Hz).

Figure 1:
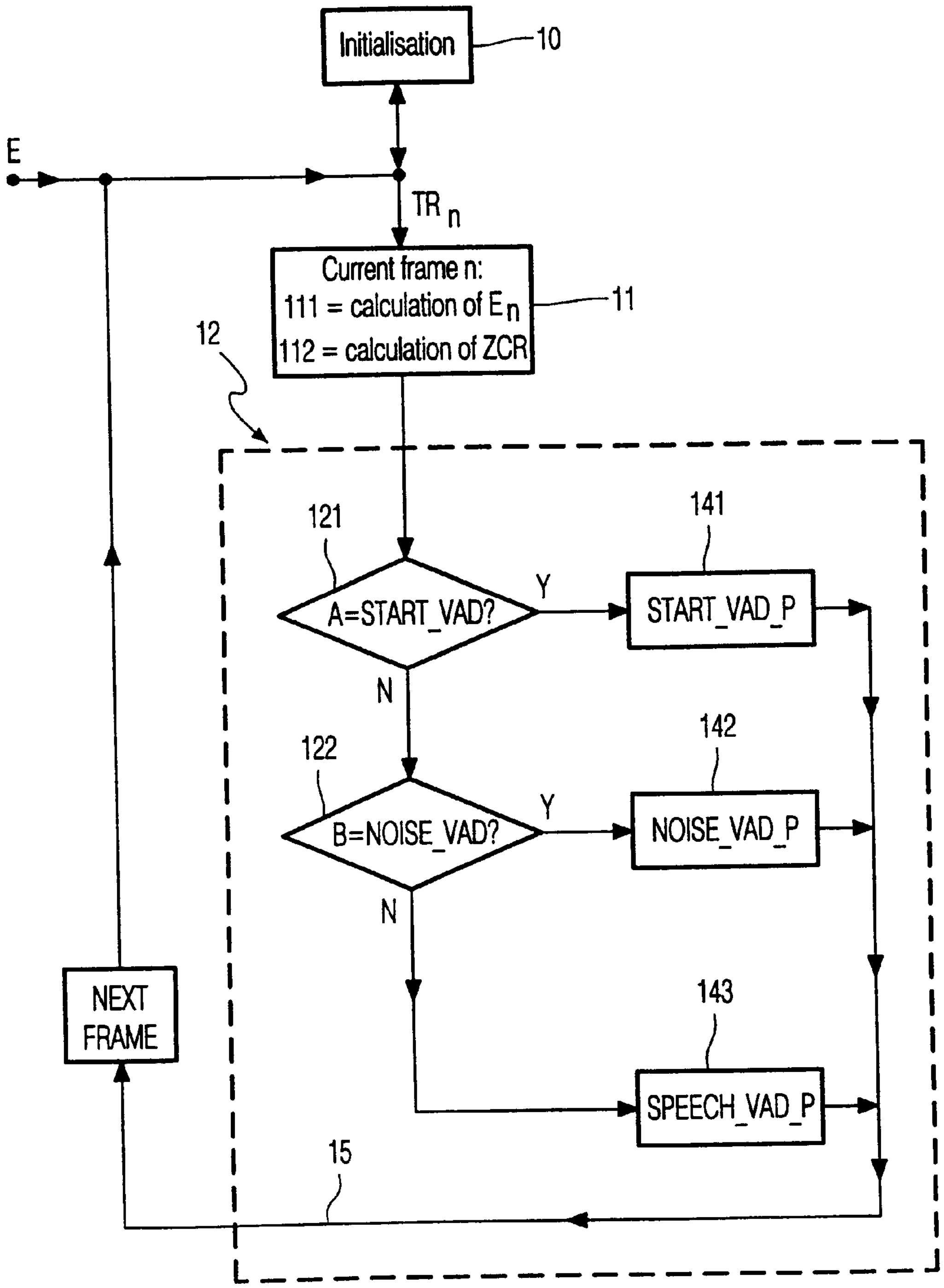
FIG. 1 shows the general mode of operation of the embodiment of the method according to the invention.
Figure 2:
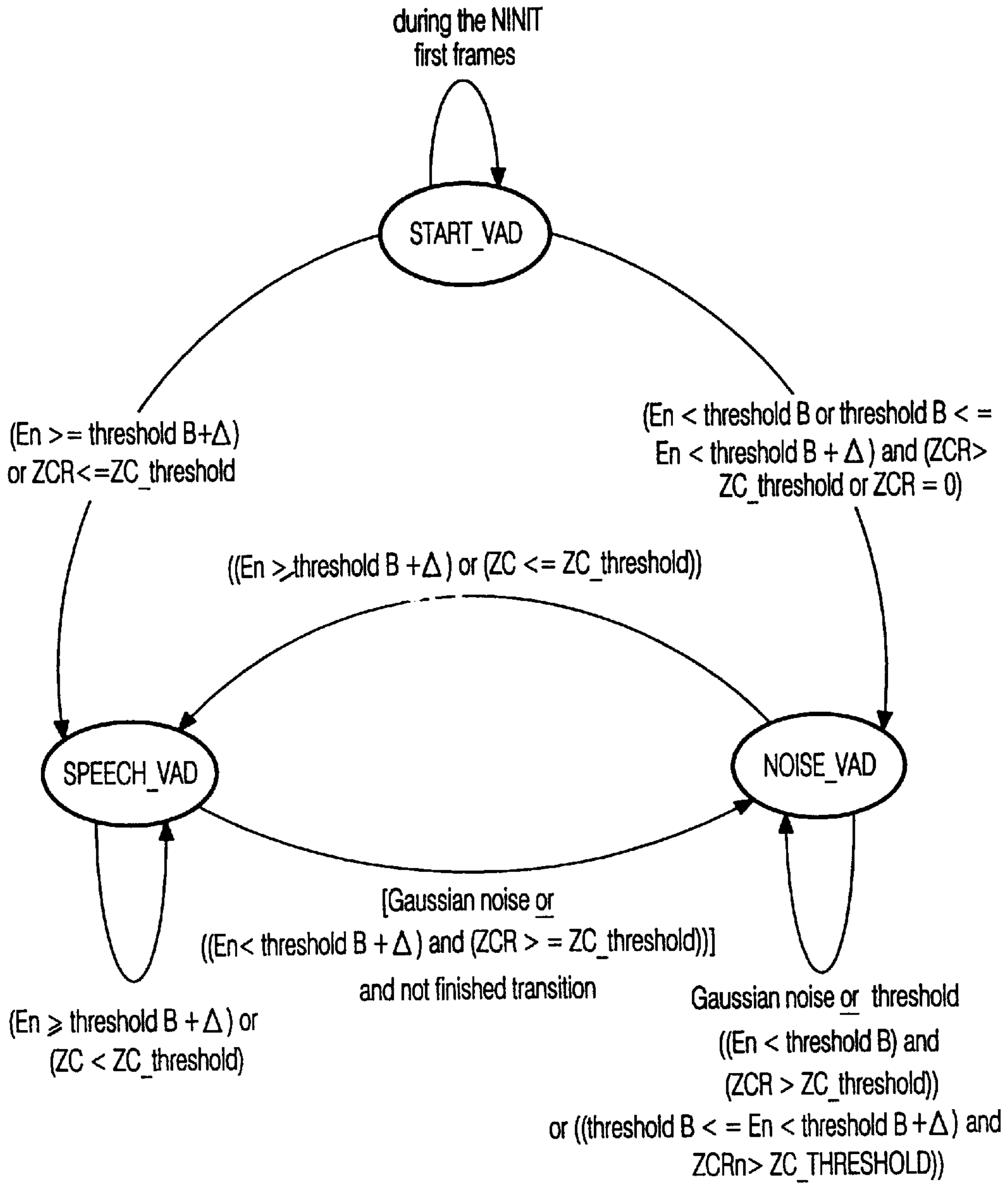
FIG. 2 illustrates in more detail this mode of operation and outlines the three states that can be assumed by the detection device ensuring this mode of operation.

The principle of the mode of operation of the method according to the invention is illustrated in FIG. 1. After a preliminary step in a stage 10 for the initialization of variables used in the course of the procedure, each current frame $TR_n$ of the input signals received on the input E undergoes in a calculation stage 11 a first calculation step of the energy $E_n$ of this frame and of the zero-crossing rate of the centered noise signal for this frame (the meaning of this variable which will be called ZCR, or also ZC, in the following of the description will be described in more detail below). A second step makes it then possible in a test and processing stage 12 to compare the energy with an adaptive threshold and the ZCR with a fixed threshold to decide whether the input signal represents a "speech+noise+silence" signal, or an only "noise+silence" signal. This second step is carried out in what will hereafter be called a three-state automaton of which the operation is illustrated in FIG. 2. These three states are also shown in FIG. 1.

The first state, START_VAD is a starting state denoted A in FIG. 1. With each start of the processing according to the invention, the system enters this state where the input signal is always considered a speech signal (even if noise is also detected). This initialization state notably makes it possible to adjust internal variables and is maintained for the period required (for various consecutive frames, this number of frames denoted N-INIT obviously being adjustable).

The second state, SPEECH_VAD corresponds to the case where the input signal is considered a "speech+noise+silence" signal. The third state, NOISE_VAD corresponds to the case where the input is considered an only "noise+silence" signal (it will be noted here that the terms of "first" and "second" state do not define the order of importance, but are only intended to differentiate the states). After the N-INIT first frames, the system is always in this second or in this third state. The transition from one state to the next will be described below.

After the initialization, the first calculation step in stage 11 comprises two sub-steps, the one carried out in a calculation circuit 111 for calculating the energy of the current frame and that of the calculation of the ZCR for this frame carried out in a calculation circuit 112.

In general, a speech signal (that is to say, a "speech+noise+silence" signal) has more energy than an only "noise+silence" signal. It is certainly necessary that the background noise is very hard, so that it is not detected as noise (that is to say, as a "noise+silence" signal), but as a speech signal. The circuit 111 for calculating the energy thus provides to associate to the energy a variable threshold depending on the value of the latter with a view to tests which will be realized in the following manner:

(a) if the energy $E_n$ of the current frame is lower than a certain threshold B ($E_n$<threshold B), the current frame is classified as NOISE;

(b) if the energy $E_n$, on the other hand, is higher than or equal to the threshold B ($E_n$>=threshold B), the current frame is classified as SPEECH.

In fact, one chooses to have a threshold B that is adaptive as a function of background noise, that is to say, for example to adjust it as a function of the average energy E of the "noise+silence" signal. Moreover, fluctuations of the level of this "noise+silence" signal are permitted. The adaptation criterion is then the following:

(i) if ($E_n$<threshold B), then threshold B is replaced by threshold B−α.E, where α is a constant factor determined empirically, but comprised between 0 and 1 in this case;

(ii) if (threshold B<$E_n$<threshold B+Δ), then threshold B is replaced by threshold B+α.E (Δ=complementary threshold value).

In these two situations (i) and (ii) the signal is considered "noise+silence" and the average E is updated. If not, if $E_n \geqq$threshold B+Δ, the signal is considered speech and the average E remains unchanged. To avoid that threshold B does not augment or diminish too much, its value is compelled to remain between two threshold values THRESHOLD B_MIN and THRESHOLD B_MAX determined empirically. On the other hand, the value of Δ itself is greater or smaller here depending on whether the input signal (whatever it is: only speech, noise+silence, or a mixture of the two) is higher or lower. For example, by designating $E_{n-1}$ as the energy of the preceding frame $TR_{n-1}$ of the input signal (which is stored), a decision of the following type will be made:

(i) if $|E_n - E_{n-1} -|$<threshold, Δ=DELTA1;

(ii) if not, Δ=DELTA2, the two possible values of Δ being, there again, determined empirically.

As the calculation of the energy has been carried out in circuit 111, the calculation of the ZCR for the current frame, carried out in the circuit 112, is associated thereto. These calculations in stage 11 are followed by a decision operation concerning the state in which the device is after the various described steps have been started. More precisely, this decision method carried out in a stage 12 comprises two essential tests 121 and 122 which will now be described in succession.

Figure 3:
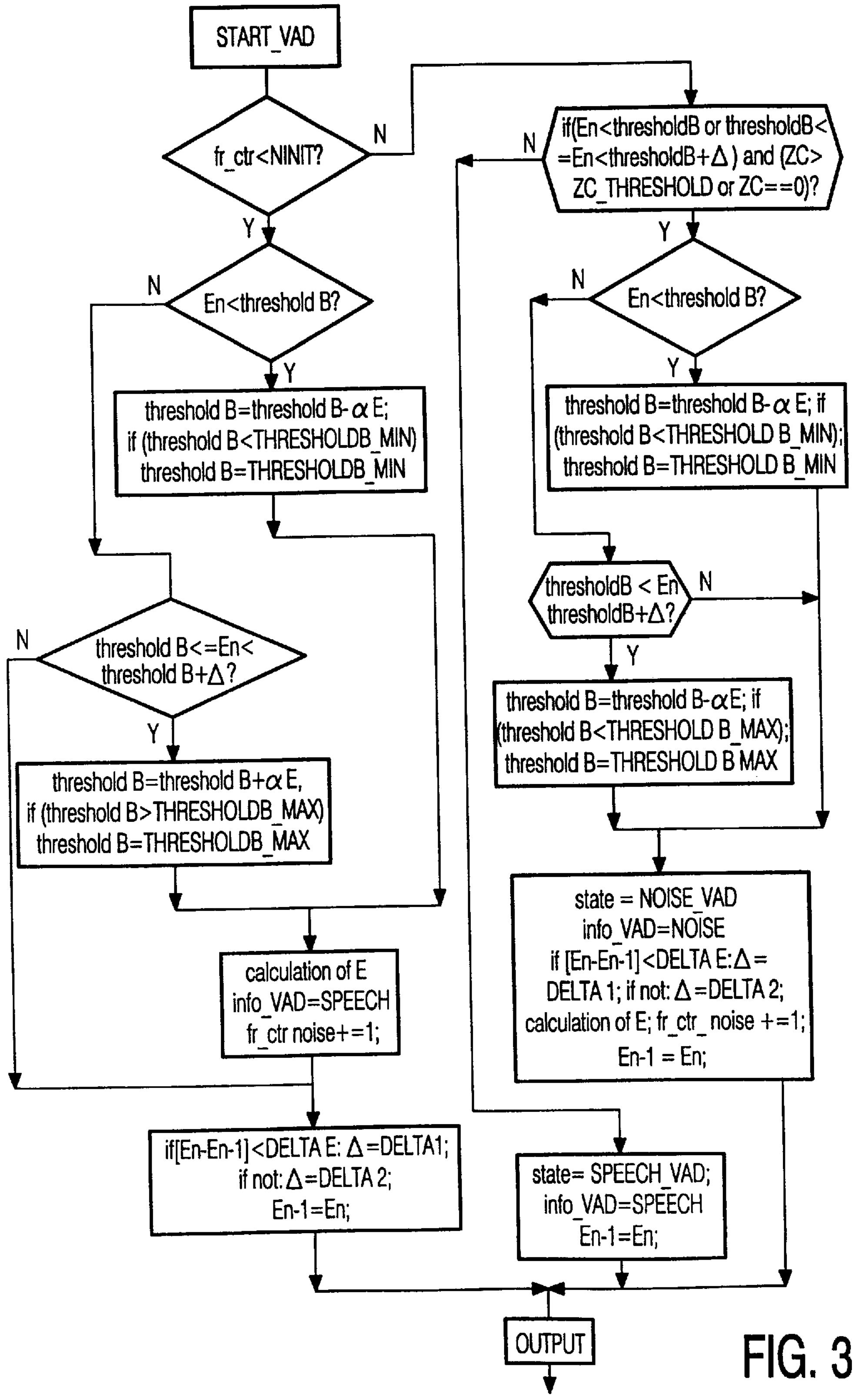
FIGS. 3 to 5 explain the processing effected in said device when it is in each of these three states.

It has been observed that with each start of the processing according to the invention, the starting step was A=START_VAD, during N-INIT consecutive frames. The first test 121 of the state of the device relates to the number of frames which are applied to the input of the device and leads to the conclusion that the state is and continues to be START_VAD (response Y after the test 121), although the number of applied frames remains less than N-INIT. In that case, the resulting processing called START_VAD_P and executed in block 141 is shown in FIG. 3, commented hereinafter. However, there may be indicated from now on that during this START_VAD_P processing it will, of necessity, happen that the observed state is no longer the starting state START_VAD but one of the other states, NOISE_VAD, or SPEECH_VAD, the distinction between them being made during the test 122.

Indeed, if after the first test 121 the response is N this time (that is to say: "no, the state is no longer START_VAD"), the second test 122 examines whether the observed state is B=NOISE_VAD with a "yes" or "no" response as previously. If the response is "yes" (response Y after 122), the resulting processing called NOISE_VAD_P is carried out in block 142 and illustrated in FIG. 4. If the response is no (response N after 122), the resulting processing executed in block 143 is called SPEECH_VAD_P and is illustrated in FIG. 5 (as for START_VAD_P, the FIGS. 4 and 5 will be commented on below). Whatever the one of the three processing that is carried out after these tests 121 and 122, it is followed by a loop-back to the input of the device via the connection 15 which connects the output of the blocks 141 and 143 to the input of the circuit 11. It will thus be possible to examine and process the next frame.

Figure 4:
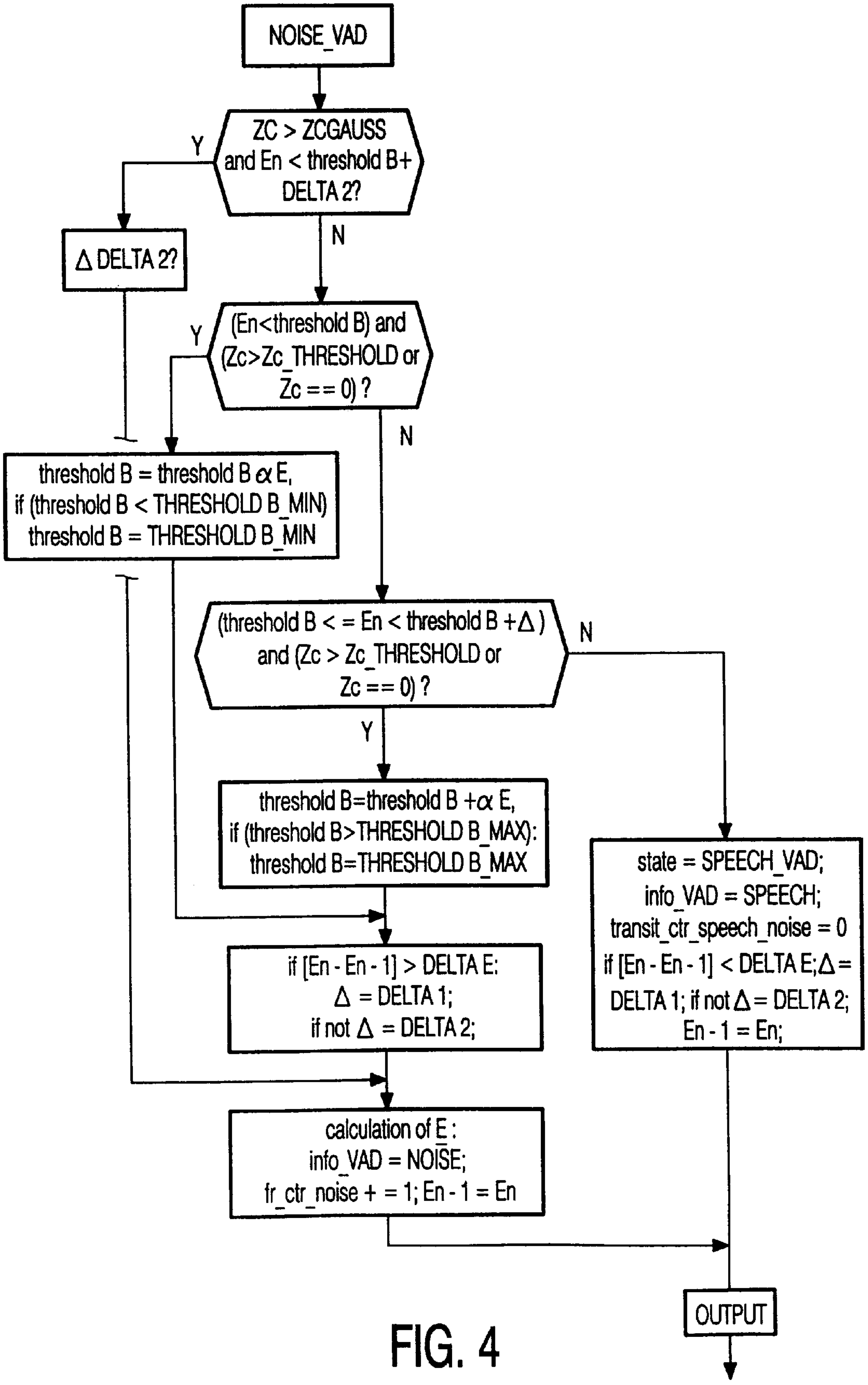
Figure 5:
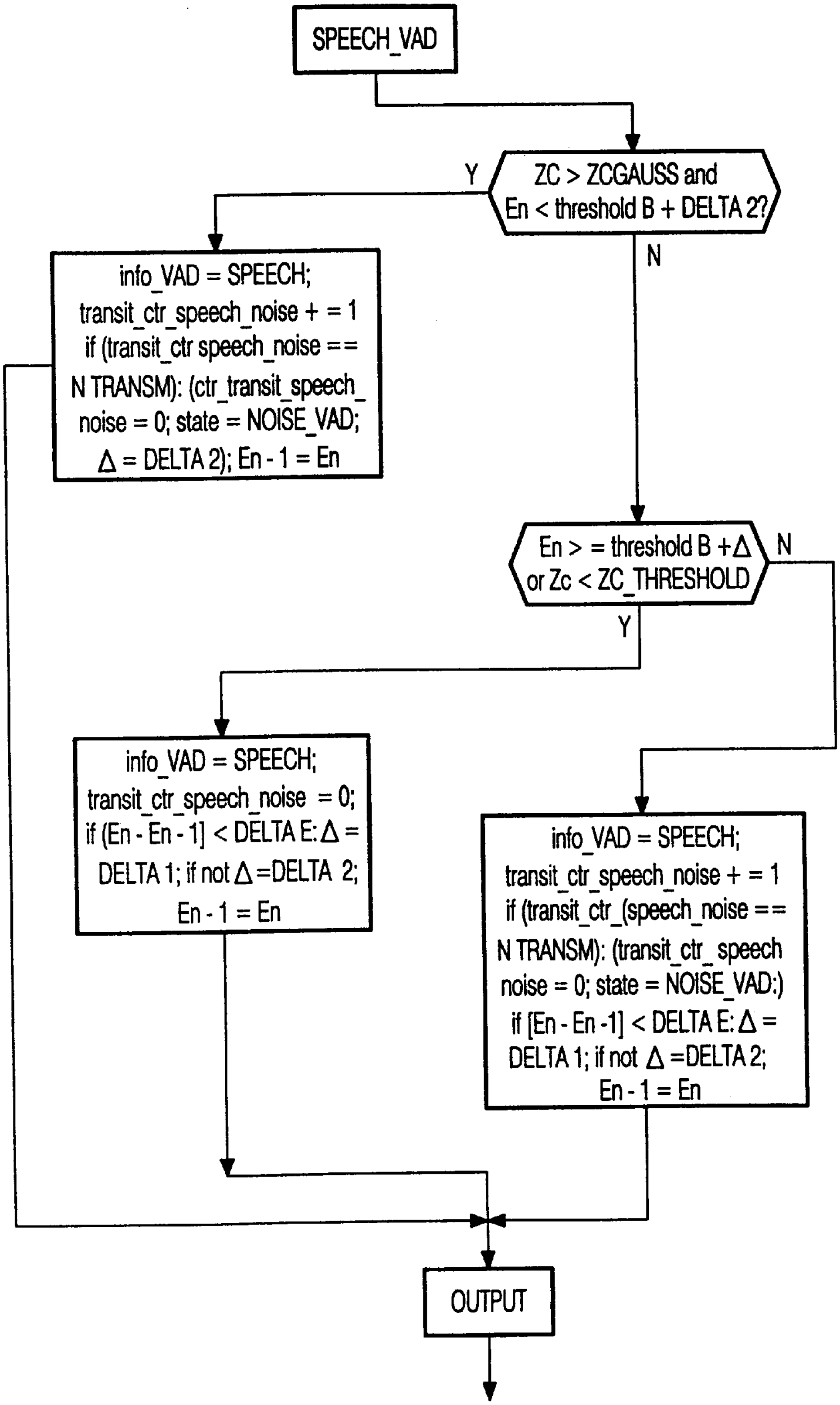

FIGS. 3, 4 and 5, whose essential aspects are summarized in FIG. 2 thus describe in detail how the processing START_VAD_P, NOISE_VAD_P and SPEECH_VAD_P are run. The variables used in these Figures are the following variables explained per category:

(1) energy: $E_n$ designates the energy of the current frame, $E_{n-1}$ that (stored) of the preceding frame, and E the average energy of the background noise;

(2) counters:

(a) a counter fr_ctr counts the number of frames acquired since the beginning of the use of the method (this counter is only used in the state START_VAD, and the value it may reach is at most equal to N-INIT);

(b) a counter fr_ctr_noise counts the number of frames detected as noise since the beginning of the use of the method (to avoid excessive calculations, the counter is only updated when the value it reaches is lower than a certain value, beyond which the counter is no longer used);

(c) a counter transit_ctr used for smoothing the speech/noise transitions avoids truncating the ends of the phrases or detecting the intersyllabic spaces (which completely cut up the speech signal) as background noise while conditionally postponing the switching of the state SPEECH_VAD to the state NOISE_VAD:

if one is in the speech state and when noise is detected, this counter transit_ctr is incremented;

if speech is detected again, this counter is reset to zero, if not, it continues to be incremented until a threshold value N-TRANSM is reached: this confirmation that the input signal is indeed background noise now causes the switching to the state NOISE_VAD and the counter transit_ctr is reset to zero;

(3) thresholds: threshold B designates the threshold used for distinguishing speech from low-level background noise (THRESHOLD B_MIN and THRESHOLD B_MAX are its authorized minimum and maximum values), Δ the value of the updating factor of threshold B, and Δ the complementary threshold value used for distinguishing speech from hard background noise (its two possible values are DELTA1 and DELTA2, determined thanks to DELTAE which is the threshold used with $|E_n-E_{n-1}|$ and which allows to know, in view of the updating of Δ, whether the input signal is very fluctuating or not);

(4) ZCR of the current frame: this zero-crossing rate of the centered noise signal fluctuates considerably:

certain types of noise are very unsettled with time, and the noise signal (centered, that is to say, whose average value has been removed) thus often crosses zero, whence a high ZCR (this is the case, particularly, with background noise of a Gaussian type);

when the background noise is the hum of conversation (restaurants, offices, neighbors talking . . . ), the characteristic features of background noise come near to those of a speech signal and the ZCR has lower values;

certain types of speech sounds are called voiced and have a certain periodicity: this is the case of vowels to which correspond much energy and a low ZCR;

other types of speech sounds called voiceless speech sounds have, on the other hand, compared with the voiced sounds, less energy and a higher ZCR: this is the case notably with fricative and plosive consonants (such signals would be classified as noise as their ZCR surpasses a given threshold ZCGAUSS if this test would not be completed by the one of the energy: these signals would only be confirmed as noise if their energy remained below (threshold B+DELTA2), but they would continue to be classified as speech in the opposite case);

finally, the particular case of a zero ZCR (ZC is 0) is also to be taken into account: this corresponds to a flat input signal (all the samples have the same value) which will thus systematically be assimilated to "noise+silence";

(5) output signal INFO_VAD: at the beginning of each processing (in one of the blocks 141 to 143), a decision is made with respect to the current frame, the latter being indeed declared either as a speech signal (INFO_VAD=SPEECH), or as background signal +silence (INFO_VAD=NOISE).

These processing in the blocks 141 to 143 comprise, as indicated, either tests of the energy and of the ZCR indicated in the frames in the form of diamonds (with the exception of the first test in the first processing START_VAD_P which is a test of the value of the counter fr_ctr, for verifying that the number of frames is still lower than the value N-INIT and that one is still in the initialization phase of the device), or operations which are controlled by the results of these tests (possible modification of threshold values, calculation of average energy, definition of the state of device, incrementation or reset-to-zero of counters, transition to the next frame, etc.), and which are thus indicated in the frames of rectangular form.

The method and the device thus proposed finally offer very moderate complexity which renders their introduction in real time particularly simple. There may also be observed that little memory cumbersomeness is associated therewith. Of course, variants of this invention may be proposed without, however, leaving the scope of this invention. More particularly, the nature of the test 122 may be modified and after a negative result of the test 121 there may be examined whether the new state observed is SPEECH_VAD (and no longer NOISE_VAD), with a positive or negative (Y or N) response as above. If the response is yes (Y) after 122, the resulting processing will be SPEECH_VAD_P (thus executed in block 142), if not, this processing will be NOISE_VAD_P (thus executed in block 143).

What is claimed is:

1. A method for detecting speech signals in input signals comprising:

calculating energy of said input signals;

comparing said energy with an adaptive threshold;

reducing said adaptive threshold by a fraction of said energy to form a reduced threshold if said energy is less than said adaptive threshold;

increasing said adaptive threshold by a factor to form an increased threshold if said energy is greater than said adaptive threshold, wherein said factor is one of a first factor and a second factor, said first factor being chosen when a difference between said energy of a current frame and said energy of a previous frame is less then said adaptive threshold;

classifying said input signals as noise if said energy is below said reduced threshold; and classifying said input signals as said speech signals if said energy is above said increased threshold.

2. The method of claim 1, wherein said reduced threshold and said increased threshold are between a minimum threshold and a maximum threshold.

3. The method of claim 1, wherein said reduced threshold is higher than a minimum threshold.

4. The method of claim 1, wherein said increased threshold is lower than a maximum threshold.

5. A device for detecting speech signals in input signals comprising:

calculating means for calculating energy of said input signals;

comparing means for comparing said energy with an adaptive threshold;

adapting means for reducing said adaptive threshold by a fraction of said energy to form a reduced threshold if said energy is less than said adaptive threshold, and for increasing said adaptive threshold by a factor to form an increased threshold if said energy is greater than said adaptive threshold, wherein said factor is one of a first factor and a second factor, said first factor being chosen when a difference between said energy of a current frame and said energy of a previous frame is less then said adaptive threshold; and classifying means for classifying said input signals as noise if said energy is below said reduced threshold, and for classifying said input signals as said speech signals if said energy is above said increased threshold.

6. The device of claim 5, wherein said reduced threshold and said increased threshold are between a minimum threshold and a maximum threshold.

7. The device of claim 5, wherein said reduced threshold is higher than a minimum threshold.

8. The device of claim 5, wherein said increased threshold is lower than a maximum threshold.

* * * * *